United States Patent
Daney

(10) Patent No.: US 10,512,982 B2
(45) Date of Patent: Dec. 24, 2019

(54) PIPE ASSEMBLY STATION

(71) Applicant: Petrofac Services Ltd., London (GB)

(72) Inventor: Laurent Daney, Dubai (AE)

(73) Assignee: Shanghai Zhenhua Heavy Industries Co., Ltd., Shanghai (CN)

( * ) Notice: Subject to any disclaimer, the term of this patent is extended or adjusted under 35 U.S.C. 154(b) by 46 days.

(21) Appl. No.: 15/556,686

(22) PCT Filed: Mar. 10, 2016

(86) PCT No.: PCT/EP2016/055184
§ 371 (c)(1),
(2) Date: Sep. 8, 2017

(87) PCT Pub. No.: WO2016/142488
PCT Pub. Date: Sep. 15, 2016

(65) Prior Publication Data
US 2018/0043452 A1    Feb. 15, 2018

(30) Foreign Application Priority Data

Mar. 10, 2015  (GB) .................................. 1504056.1

(51) Int. Cl.
*B23K 9/028* (2006.01)
*B23K 37/02* (2006.01)
(Continued)

(52) U.S. Cl.
CPC ........ *B23K 9/0286* (2013.01); *B23K 37/0229* (2013.01); *B23K 37/0247* (2013.01);
(Continued)

(58) Field of Classification Search
CPC ........... B23K 9/028–0288; B23K 37/02–0294; B23K 37/053; F16L 1/12
See application file for complete search history.

(56) References Cited

U.S. PATENT DOCUMENTS 4,283,617 A * 8/1981 Merrick ............... B23K 9/0286
219/125.1
4,311,031 A * 1/1982 Schwarze ............ B21D 43/006
414/223.02
(Continued)

FOREIGN PATENT DOCUMENTS

CN    103567677 A    2/2014
DE     2410080 A1    9/1975
(Continued)

*Primary Examiner* — Michael A Laflame, Jr.
(74) *Attorney, Agent, or Firm* — N.V. Nederlandsch Ostrooibureau; Catherine A. Shultz; Katelyn J. Bernier

(57) ABSTRACT

A pipe assembly station for performing operations on a field joint during pipe assembly has an active rail extending around an opening through which the pipe can pass. Tool carriages are arranged to traverse along the active rail and around a periphery of the pipe. The station also comprises a standby position, distanced from the active rail and a switch arranged to transfer the tool carriage from the active rail to the standby position. By providing such a combination of a rail and a standby position, a tool carriage can be brought into position on the active rail to perform a pipe joining operation and can be subsequently set back to the standby position, where it is out of the way of operations taking place on the pipe. Such a switching arrangement allows for more effective use of the limited space around the joint.

20 Claims, 10 Drawing Sheets

(51) Int. Cl.
  *F16L 1/20* (2006.01)
  *B23K 37/053* (2006.01)
  *F16L 1/12* (2006.01)
  *B23K 101/10* (2006.01)

(52) U.S. Cl.
  CPC ...... *B23K 37/0258* (2013.01); *B23K 37/0276* (2013.01); *B23K 37/053* (2013.01); *F16L 1/12* (2013.01); *F16L 1/202* (2013.01); *F16L 1/206* (2013.01); *F16L 1/207* (2013.01); *B23K 2101/10* (2018.08)

(56) References Cited

U.S. PATENT DOCUMENTS

| | | | | |
|---|---|---|---|---|
| 4,896,812 | A * | 1/1990 | Kazlauskas | B23K 9/0286 219/130.4 |
| 6,313,426 | B2 | 11/2001 | Belloni et al. | |
| 6,796,742 | B1 * | 9/2004 | Roger | B23K 9/0286 405/166 |
| 10,279,412 | B2 * | 5/2019 | Cruickshank | B63B 35/03 |
| 2001/0017292 | A1 * | 8/2001 | Belloni | B23K 9/0286 219/125.11 |
| 2006/0076328 | A1 * | 4/2006 | Hastings | B23K 9/028 219/125.11 |
| 2007/0023479 | A1 * | 2/2007 | Koppert | B23K 9/0286 228/101 |
| 2009/0245940 | A1 | 10/2009 | Bajema | |
| 2010/0176183 | A1 | 7/2010 | Hees | |
| 2011/0079584 | A1 | 4/2011 | Hees | |
| 2012/0074632 | A1 | 3/2012 | Dagenais | |

FOREIGN PATENT DOCUMENTS

| | | |
|---|---|---|
| GB | 2159748 A | 12/1985 |
| GB | 2345016 A | 6/2000 |
| GB | 2482693 A | 2/2012 |
| WO | 2013/186732 A1 | 12/2013 |

\* cited by examiner

PIPE ASSEMBLY STATION

BACKGROUND OF THE INVENTION

1. Field of the Invention

The present invention relates to offshore pipe assembly operations during pipe-laying and in particular to a pipe assembly station that can be used during such operations. The invention further relates to a vessel incorporating such a station and to methods of performing pipe assembly operations in vertical and inclined mode.

2. Description of the Related Art

Pipe-lay vessels are generally known in various configurations. They may be broadly divided into three main principles of operation, namely J-lay vessels for deep water, near vertical pipe deployment, S-lay horizontal or low angle deployment and reel lay. In J-lay and S-lay operations, successive pipe segments (single joints, double joints, triple joints, quad joints etc) are welded to the pipe string at a field joint and deployed towards the seabed. In the case of reel lay, a continuous pipe is unwound from a reel with a field joint being provided at the end of each reel.

The assembly of the two pipe ends from the pipe upper section (string) and the catenary (lower section) requires different successive operations including but not limited to: weld preparation; fit up control; preheating; welding; weld cooling; weld inspection; internal or external weld toe modifications; field joint surface preparation; field joint anti-corrosion insulation; and field joint thermal insulation. Different tools are generally provided to support all of these consecutive operations.

Within the confines of a pipe assembly station or pipe-lay derrick, the available space for all of these tools may be limited. Many of the tools are extremely bulky and each may require its own supply of power and other essentials. Each tool will require one or more operators and movement of tools and operators is a complex and sometimes hazardous operation, given that the vessel itself may be moving.

A device has been proposed for facilitating such operations by providing welding equipment carriers that move along a guide surrounding the pipe at the location of the weld. One such device is disclosed in US2007/0023479, which includes a drive for moving the welding equipment carrier along a track and an umbilical to connect the welding equipment to the welding equipment carrier.

Although existing systems facilitate such pipe assembly, it would be desirable to further improve on such processes and apparatus.

BRIEF SUMMARY OF THE INVENTION

According to the invention, there is provided a pipe assembly station for performing operations on a field joint during pipe assembly, the pipe assembly station comprising an active rail extending around an opening through which the pipe can pass and a tool carriage arranged to traverse along the active rail and around a periphery of the pipe. The station further comprises a standby position, distanced from the active rail and a switch arranged to transfer the tool carriage from the active rail to the standby position. By providing such a combination of a rail and a standby position, a tool carriage can be brought into position on the active rail to perform a pipe joining operation and can be subsequently set back to the standby position, where it is out of the way of operations taking place on the pipe. Such a switching or shunting arrangement allows for more effective use of the limited space around the joint.

In the present context, reference to rail is intended to refer to any form of guide in the broadest possible sense that can be used to support and guide a tool carriage. In one embodiment, the rail, may be a single overhead rail, such as an I-beam, J-rail or the like, allowing the tool carriage to be suspended while ensuring free access under and around each tool carriage. It is however not excluded that the rail may be or may comprise a plurality of individual rails, such as is the case for a railway, and that the rails may be present below, above and/or beside the tool carriage.

The tool carriage may comprise any appropriate means to allow it to traverse on the rail e.g. by rolling, sliding or gliding. For the sake of the following discussion, such elements will be referred to as bogies. In the case of an overhead rail, the tool carriage may be suspended by one or more bogies engaged with the rail. In one embodiment, the tool carriage may be self-propelled for movement along the active and/or standby rail. The skilled person will be aware of various arrangements allowing the carriage to move along the rail including, but not limited to, rack and pinion arrangements, friction drive arrangements and the like. In particular, one or more of the bogies may be provided with a driven member such as a wheel, engaging with part of the rail.

The switch may also be any transfer arrangement appropriate to the form of the rail and the tool carriage and its bogies. It may be embodied as a set of points connecting between the active rail and a branch or shunt rail or it may be embodied as a laterally displaceable rail section or otherwise. The switch may also be part of the bogie or otherwise carried by the tool carriage, allowing the tool carriage to switch between adjacent rails.

According to one aspect of the invention, the active rail is continuous allowing the tool carriage to pass completely around the pipe. For certain operations it may be required for the operation to be performed more than once around the circumference of the joint in a continuous manner. Ensuring that the active rail is uninterrupted allows the tool carriage to follow the rail to complete the operation.

As will be understood a continuous rail may be used in some situations. In other situations it may be desirable to allow lateral passage of the pipe into and out of the opening. In particular, J-lay operations it may be necessary to move the pipe assembly station laterally into position around the pipe from another location once the pipe has been lowered to the reference point at which the field joint is to be made. To this end, the active rail may have a movable portion that can be moved or otherwise opened for passage of a pipe. The portion to be moved will depend on the size of the pipe being joined. In one exemplary embodiment the movable portion may have a length of at least 1 metre for allowing passage of pipe of this diameter.

In one embodiment, there is provided a standby rail extending from the switch to the standby position. According to one embodiment, the standby rail extends in a U-shape from the switch to the standby position and back to a further position adjacent to the active rail. A second switch may be arranged to transfer the tool carriage from the active rail to the standby rail at the further position. The first and second switches may be located at diagonally opposite locations on the active rail. The skilled person will readily appreciate that such a configuration allows considerable flexibility in movement of tool carriages, which is particularly the case when there are multiple tool carriages located on both the active rail and the standby rail. Additionally or alternatively, the standby rail may extend on both sides of the switch or switches and there may be provided two U-shaped loops or a plurality of standby rails and standby positions. It is also not excluded that tool carriages located on parts of the standby rail may also be used for performing operations on the pipe In a further embodiment, there may be provided a service area at the standby position arranged for servicing the tool carriage. Servicing of the tool carriage will generally be determined by the type of activity carried out but may include replacing used or damaged tools and replenishing consumables such as welding wire. In certain embodiments, the tool carriage may comprise one or more reservoirs for receiving a quantity of a working fluid and the service area may comprise a supply of the working fluid for replenishing the reservoir. This may cover the supply of compressed air, (chilled) water, sand/grit, gases, epoxy and other chemicals. The reservoir may have a capacity to receive sufficient working fluid for completion of operations on a plurality of field joints. Alternatively, the respective tool carriage may return to the service area after completion of each joint for the purpose of replenishment.

The tool carriages may each be fully autonomous. To this end, they may also be provided with their own electrical supply in the form of a rechargeable battery. Alternatively, they may receive an electrical supply e.g. from the active rail and any other rail portion on which they traverse. The electrical supply may be a DC supply located in or above the active rail. Appropriate grounding provisions may (must) also be provided.

According to one aspect of the invention, the tool carriage may comprise a wireless control unit operable to receive control signals from a remote location. The control signals may be any appropriate signals relating to operation of the tools carried by the carriage but are particularly convenient for controlling the movement of the carriage. This movement may be controlled by an operator of the tool or by further personnel or may be controlled by a central controller at the remote location. In one embodiment, the control signals are received from a signal device located on an operator and the tool carriage is controlled to follow the operator during movement of the operator around the pipe. Suitable radio frequency identification (RFID) devices are known that would allow an autonomously moveable tool carriage to identify and follow an operator both along the active rail and via the switch to the standby position. It will be understood that the wireless control unit may be operable to transmit signals e.g. to a central controller or to another tool carriage. It may thus signal a need to move to the service area for replenishing or other service and it may indicate the need for operation of the switch.

The tool carriage may be provided to perform any one or more of the number of operations that need to be performed during a pipe assembly operation. This may apply both to operations that are performed for each pipe joint and also to operations that may only be used intermittently. To this end, the tool carriage may be equipped with at least one tool selected from the group comprising but not limited to: pipe end preparation tools, preheating tools; mechanized welding tools; manual welding tools; weld repair tools; weld toe adjustment tools; weld inspection tools; field joint coating tools, field joint coating surface preparation tools; blasting tools; thermal insulation preparation tools; infrared heating tools; and fusion bonded epoxy application tools. The tool may be connected to the tool carriage by an umbilical. Alternative means may be provided for supporting the tool, including but not limited to robot arms, hydraulic arms, hoists and the like. In general the tools will be operator controlled although it is not excluded that operation of the tool may be automated.

In general, the station will comprise more than one tool carriage, preferably more than two tool carriages and more preferably four or more tool carriages. The tool carriages may all be arranged to perform a unique operation or some tool carriages may perform the same operation whereby one tool carriage may be operated while the other carriage is being serviced or otherwise replenished at the service area. According to a particular aspect of the invention, at least one active tool carriage may be located on the active rail and at least one standby tool carriage may be located on the standby rail and the station is arranged to exchange the active tool carriage for the standby tool carriage. Exchange may take place at a single switch or one switch may be responsible for departure of the active tool carriage while another switch may allow entry of the standby tool carriage onto the active rail. In this context, "active tool carriage" is merely intended to denote that it is disposed on the active rail. As discussed above, operation of the station may take place at least partially under the control of a central controller. Movement of the tool carriages and exchange of the active tool carriage for the standby tool carriage may then take place under automatic control of the central controller.

The station may additionally comprise an operator working floor and walkway for the personnel intended to carry out the operation on the pipe. The operator walkway may extend adjacent the active rail and around the opening through which the pipe passes. It will be understood that unfettered and safe access to the pipe joint is essential, especially when it may be located many metres above the water surface on a moving vessel. For an overhead rail, the operator working floor and walkway will be located below the rail.

The working floor may be closable or openable around the welding point and may comprise actuated floor doors. These floor doors may be opened for transfer of the assembly station from or to a working position and will be closed during field joint activity. Dedicated safety systems may be provided to secure the area when the floor doors are open.

The invention also relates to a pipe assembly system comprising a pipe supporting structure arranged to support two pipe-ends to be joined in abutting relation to one another to form a pipe and a pipe assembly station as described above or hereinafter, arranged about the pipe. The pipe supporting structure may be any appropriate structure capable of supporting the two pipe-ends during the operation, such as a hang-off structure and a heavy lift crane. In a preferred embodiment, the pipe supporting structure is a J-lay derrick or tower. Such a J-lay tower may have one or several assembly stations at different heights within the tower, each provided with its own pipe assembly station.

The pipe supporting structure is preferably operable both vertically and at an angle to the vertical, including angles of up to 45° to the vertical. In this context, the angle refers to the angle of the pipe axis at the location of the operation. The pipe assembly station, the active rail, the switch, the gate and the tool carriages may all remain horizontal, independent of the angle of the pipe. In this context, horizontal refers to the plane of the active rail. For operation on an angled pipe, the opening the active rail is calculated to allow the tools carriage passage over the maximum range of pipe inclinations and the active rail may define an oval shape. The active rail may also be adjustable in shape from a circular shape to an oval shape, or an oval or circular shaped active rail may also be longitudinally adjusted to be in line with the pipeline inclination. In one particular embodiment, the pipe assembly station may be mounted for lateral movement with respect to the pipe supporting structure from a position where the pipe is not surrounded by the active rail to a position where the active rail extends around the pipe. This is particularly advantageous for engagement of large pipes where the The invention further relates to a pipe-lay vessel comprising such a pipe assembly system. The pipe assembly system may be arranged over a moonpool or over a side of the vessel and may be integrated with the vessel or installed as required.

The invention still further relates to a tool carriage for use in the station described above and hereinafter. The tool carriage may comprise a drive system for engaging and moving along a rail, at least one tool for performing an operation on a field joint, a power distribution unit for distributing power to the tool; a wireless controller for receiving control signals from a remote location and controlling operation of the tool carriage, and a reservoir for receiving a quantity of a working fluid for performing the operation.

Additionally, the invention provides for a method of operating a pipe assembly station during an operation to form a field joint on a pipe assembly, the method comprising: providing an active rail adjacent to the pipe from which the operation can be carried out; providing a standby rail, extending from a position adjacent to the active rail to a position distant from the active rail; providing a tool carriage; traversing the tool carriage along the active rail and around a periphery of the pipe to perform the operation; and subsequently transferring the tool carriage from the active rail to the standby rail and moving it to the distant position. By providing an active rail and a standby rail and by transferring a tool carriage to the standby rail, additional space for operations around the pipe can be created. It will be appreciated that this is particularly important for large and heavy tool carriages that may weigh upwards of 1000 Kg and will generally weigh around 2000 Kg.

As described above, the method may comprise providing a second tool carriage located on the standby rail and transferring the second tool carriage to the active rail. The second tool carriage may take over the operation performed by the first tool carriage or may perform another operation. In a particular embodiment the tool carriage or carriages are self-propelled and the method comprises automatically controlling movement of the carriages along the rails.

laterally moving the pipe assembly station from a position where the pipe is not surrounded by the active rail to a position where the active rail extends around the pipe A computer program product adapted to perform the method as claimed is also considered to fall under the scope of the invention.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
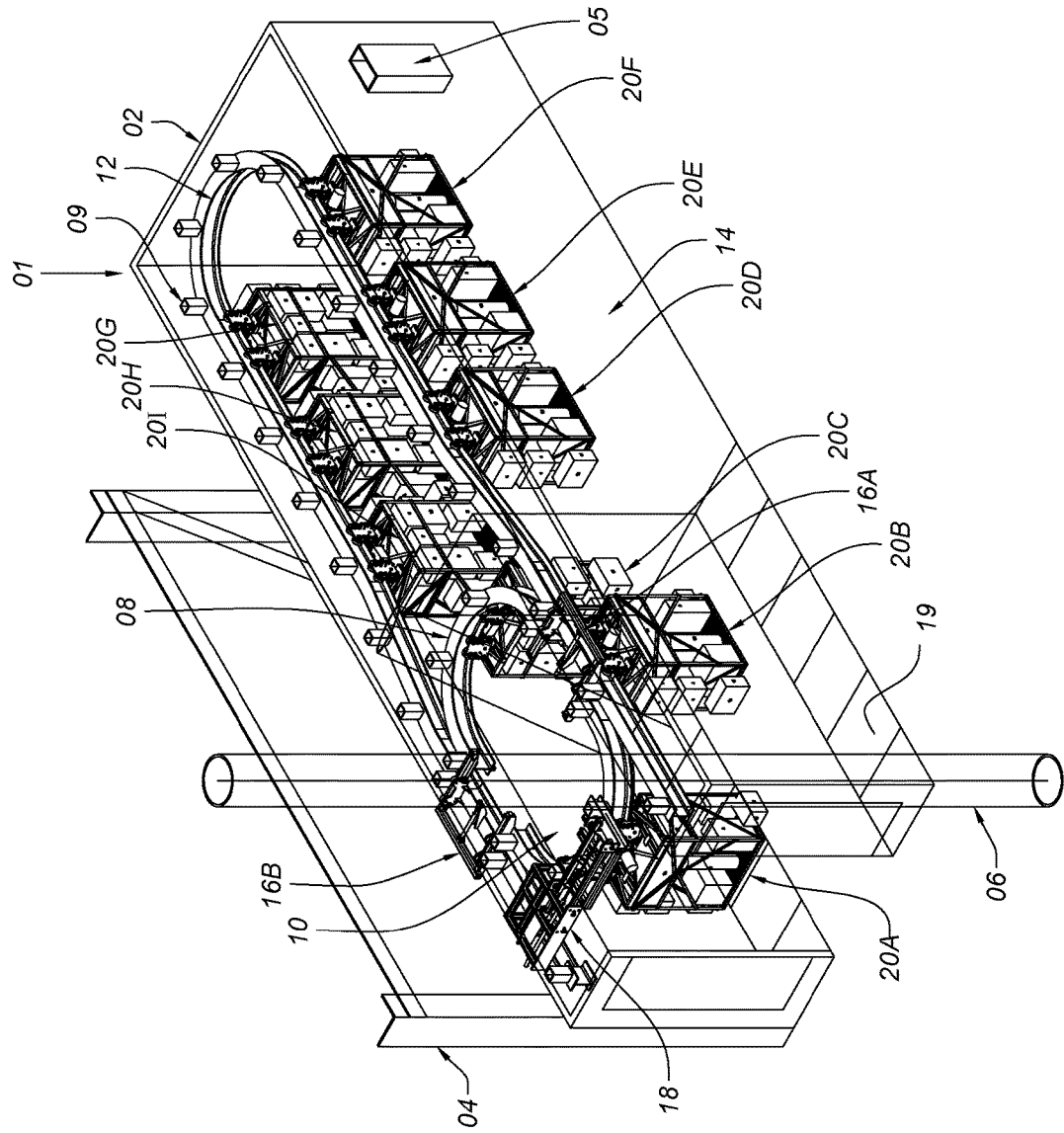
FIG. 1 shows in perspective view a pipe assembly station according to an embodiment of the present invention.

FIG. 1 depicts in perspective view a pipe assembly station 1 according to the present invention located within a J-layer tower 4 during operation on a pipe 6. The pipe assembly station 1 includes an enclosure 2, which protects the pipe assembly station and personnel from the environment during operation. Within the enclosure 2 is located an active rail 8, which forms an oval shaped loop around an opening 10 through which the pipe 6 passes. A standby rail 12 extends in a U-shaped loop from the active rail 8 to a service area 14 located at a distance from the active rail 8. A central controller 5 controls operation of the station 1 as will be described further below. The rails 8, 12 are rugged I-beam type rails of the sort used for overhead gantry operations and are supported from the roof (not shown) of the enclosure 2 by struts 9. The active rail 8 and the standby rail 12 intersect at two switches 16 A, B located at opposite sides of the opening 10. Supported on the rails 8, 12 are a plurality of tool carriages 20A-I. In the present embodiment six tool carriages 20D-I are located on the standby rail 12 at the service area 14 and three tool carriages 20A-C are located on the active rail 8 and switch 16. FIG. 1 also depicts a gate 18 allowing opening of a movable portion of the active rail at the side opposite to the service area 14 and a number of opening wall and floor panels 19 to the enclosure 2.

Figure 2:
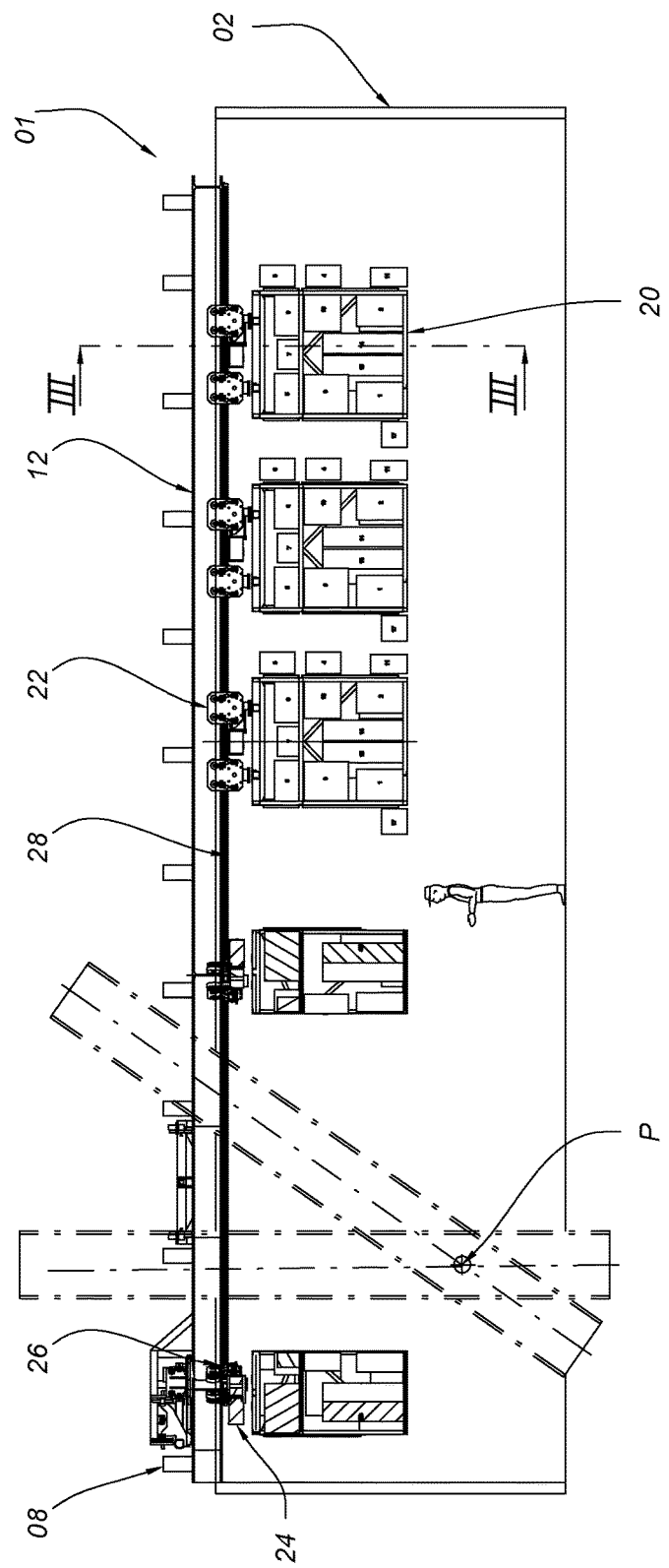
FIG. 2 shows the pipe assembly station of FIG. 1 in side elevation.

FIG. 2 depicts the pipe assembly station 1 of FIG. 1 in a side elevation. As can be seen in this view, each tool carriage 20 is provided with a pair of gliders or bogeys 22 by which it is suspended from the rails 8, 12. The bogeys 22 are conventional heavy-duty hoist components and are swivel connected to the carriage 20 allowing them to follow the curved portions of rails 8, 12. Provided between each set of bogeys is a motor drive 24 having a pinion wheel 26. The pinion wheel 26 engages with a toothed rack 28 formed on the underside of the rails 8, 12 as will be further discussed below. It will be understood that other appropriate arrangements for driving the carriages 20 along the rails 8, 12 may be provided. FIG. 2 also depicts the position of the pipe 6 during pipe assembly at an angle from the vertical. As can be seen, angling of the pipe 6 requires the path of the active rail 8 to be elongate such as to ensure that each tool carriage 20 can pass completely around the field joint reference point P.

Figure 3:
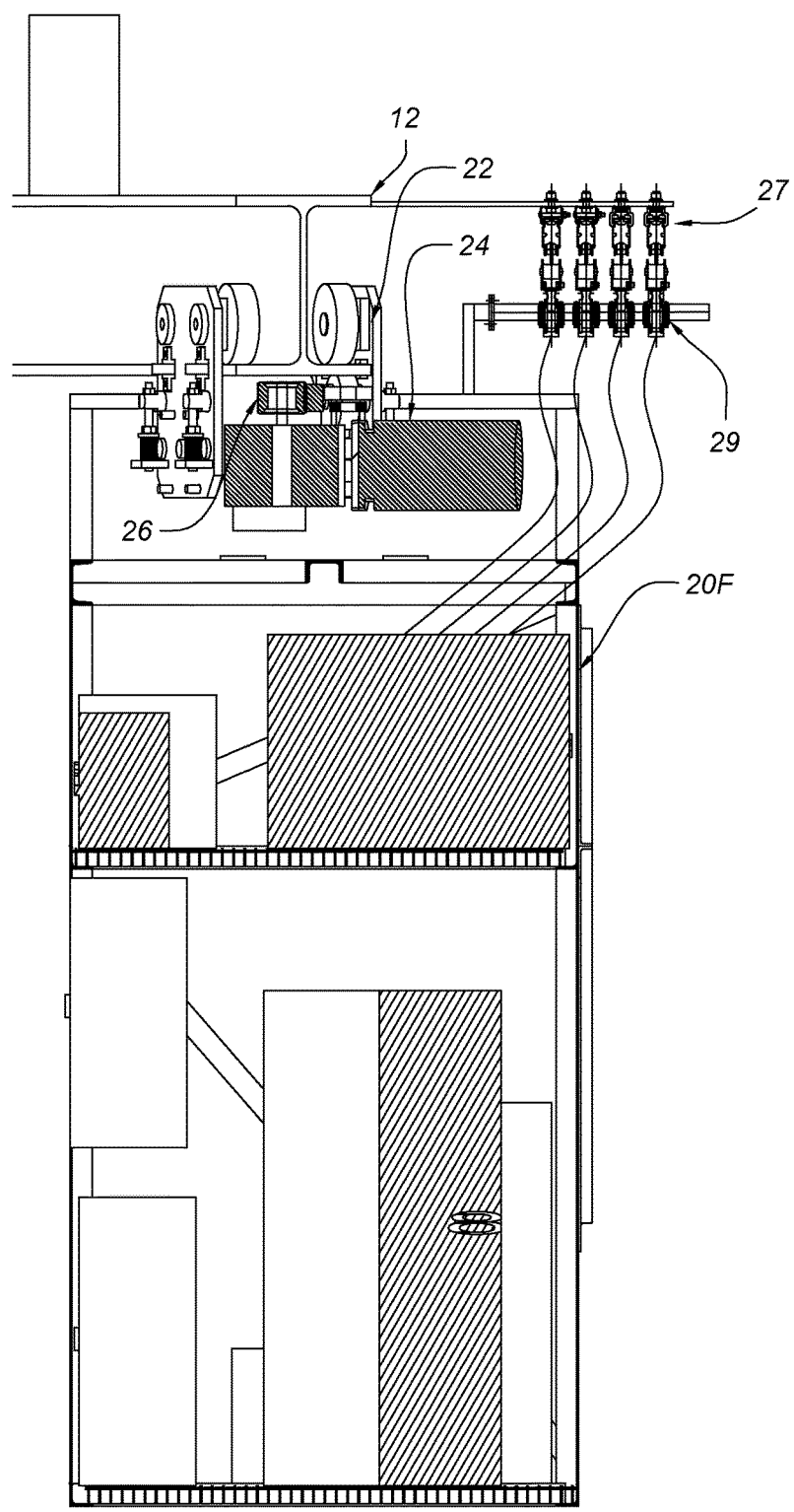
FIG. 3 shows a cross-sectional detail through one of the tool carriages of FIG. 2 along line III-III.

FIG. 3 shows a detail of the tool carriage 20F in cross section along the line of FIG. 2 illustrating in greater detail the motor drive 24, the bogeys 22, the pinion wheel 26 and the toothed rack 28. FIG. 3a also shows a power supply rail 27 carried on the standby rail 12 and having sliding contacts 29 for power delivery to the carriage 20F.

Figure 4:
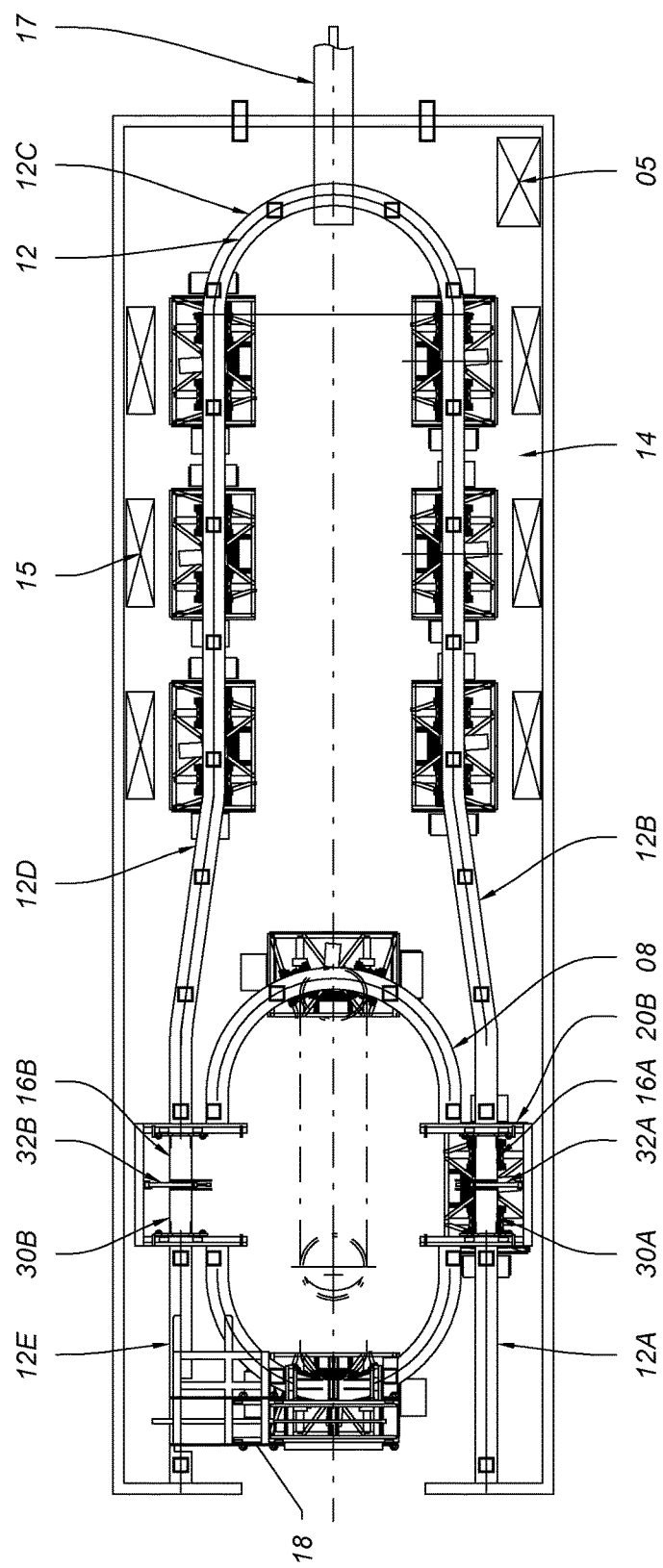
FIG. 4 shows the pipe assembly station of FIG. 1 in plan view.

FIG. 4 depicts the pipe assembly station 1 of FIG. 1 in plan view. The standby rail 12 has a first end portion 12A extending aft from first switch 16A, a first service portion 12B extending forward from the first switch 16A to the service area 14, a loop portion 12C, a second service portion 12D extending from the service area 14 to second switch 16B and a second end portion 12E extending aft from the second switch 16B. FIG. 4 also shows the switches 16A, B in greater detail, indicating transfer rail segments 30A, B that can move from the active rail 8 to the standby rail 12 on actuation by switch actuators 32A, B. In the situation according to FIG. 4, first switch 16A has its transfer rail segment 30A aligned with the standby rail 12 between the first end portion 12A and the first service portion 12B. The tool carriage 20B located on the transfer rail segment 30A can either move aft onto the first end portion 12A or forward onto the first service portion 12B. The second switch 16B is also aligned with the standby rail 12.

FIG. 4 also depicts the service area 14 having a number of servicing posts 15 for replenishing consumables and otherwise servicing the tool carriages 20 and a gantry 17 by which tool carriages 20 may be removed from or installed onto the standby rail. The tool carriages 20 have a weight of between 1 and 3 metric tonnes according to their configuration and the gantry 17 is configured accordingly.

Figure 5A:
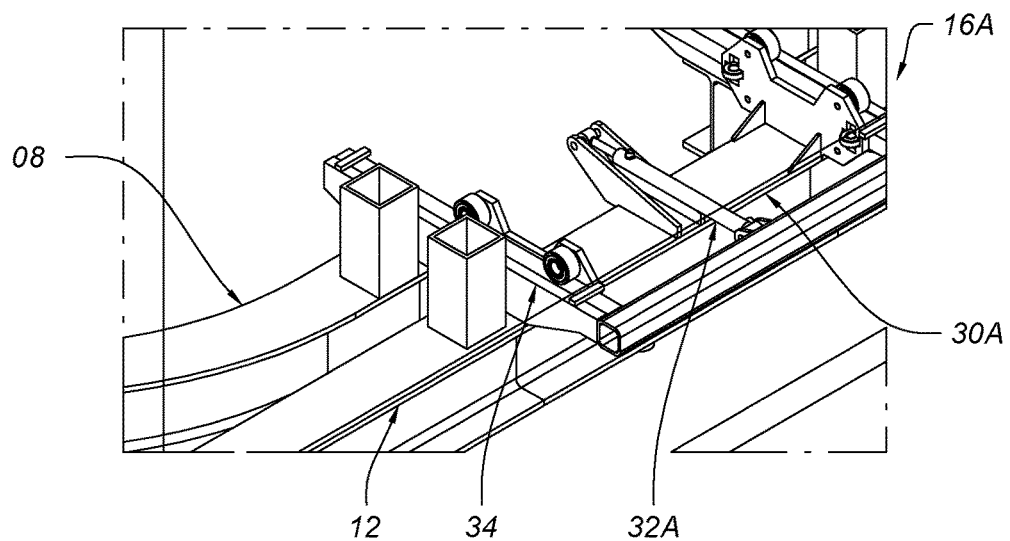
FIGS. 5a and 5b show details of the switches of FIG. 1 in perspective view.
Figure 5B:
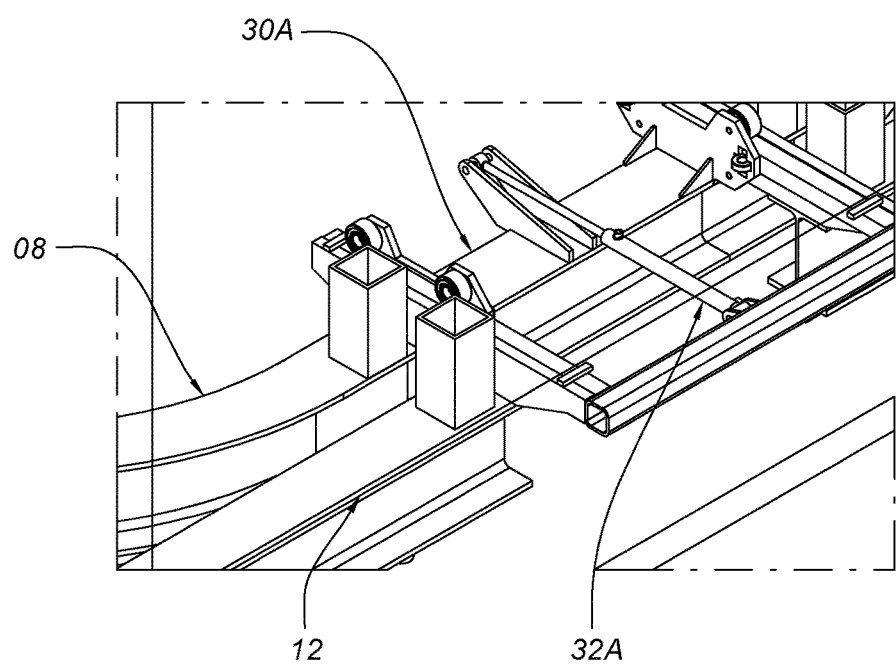

FIGS. 5a and 5b show switch 16A in further detail in perspective view. As can be seen, the transfer rail segment 30A is supported on guides 34 allowing it to move laterally between the active rail 8 and the standby rail 12. In FIG. 5a, the transfer rail segment 30A is in the position corresponding to FIG. 4, aligned with the standby rail 12. The switch actuator 32A is in a retracted position. In FIG. 5b, the switch actuator 32A is in an extended position and the transfer rail segment 30A is aligned with the active rail 8.

Figure 6A:
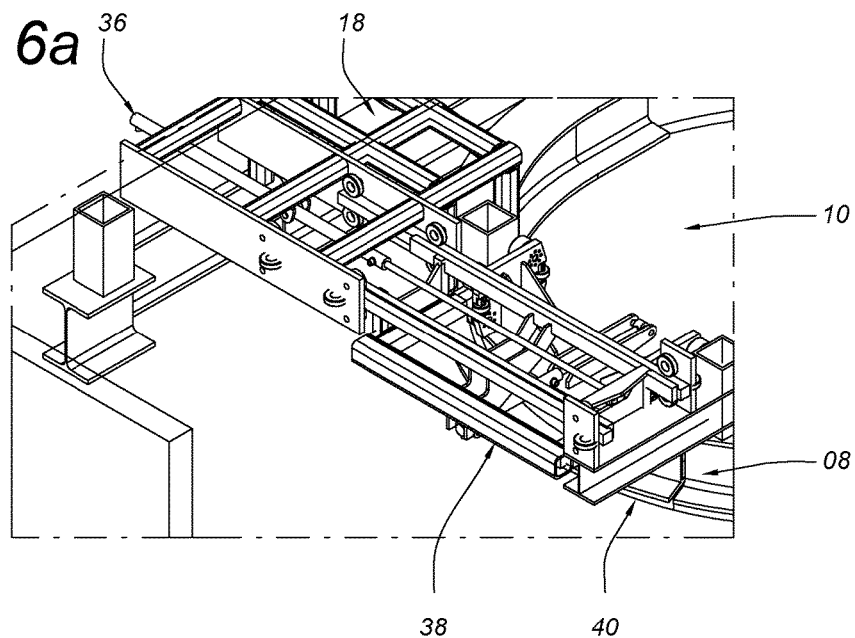
FIGS. 6a and 6b show details of the gate of FIG. 1 in perspective view.
Figure 6B:
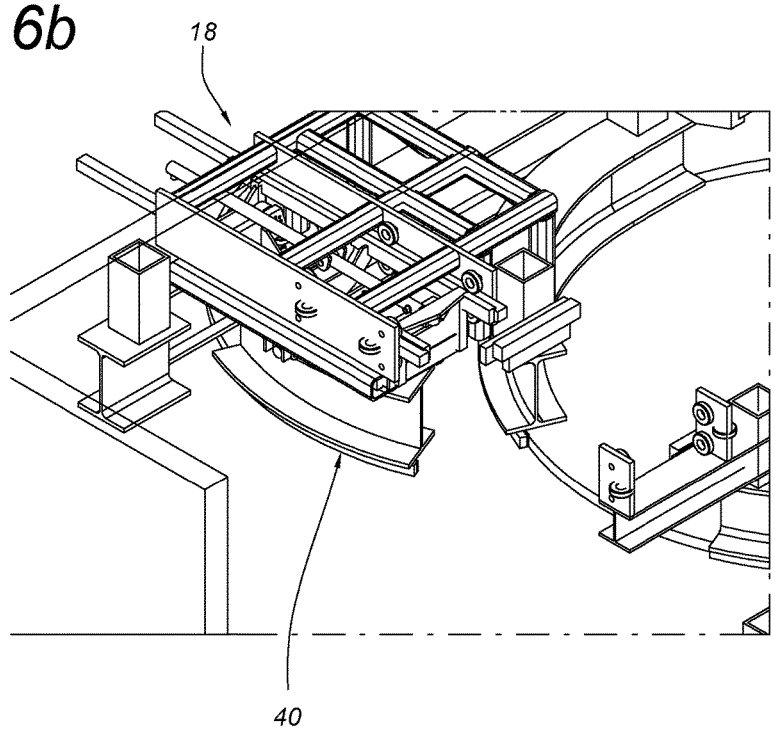

FIGS. 6a and 6b show perspective detailed views of the gate 18 of FIG. 1. The gate 18 comprises a set of gate actuators 36 and gate guides 38 arranged to move a movable portion 40 of the active rail 8 to an offset position to one side of the opening 10. The moveable portion has a length of just over 1 m in order to allow passage of pipes of up to 36" OD. In FIG. 6a the moveable portion 40 is in the closed position and tool carriages 20 can traverse on the active rail 8. In FIG. 6b, the moveable portion 40 is in the open position and the active rail 8 is open for lateral entry of the pipe 6.

Figure 7:
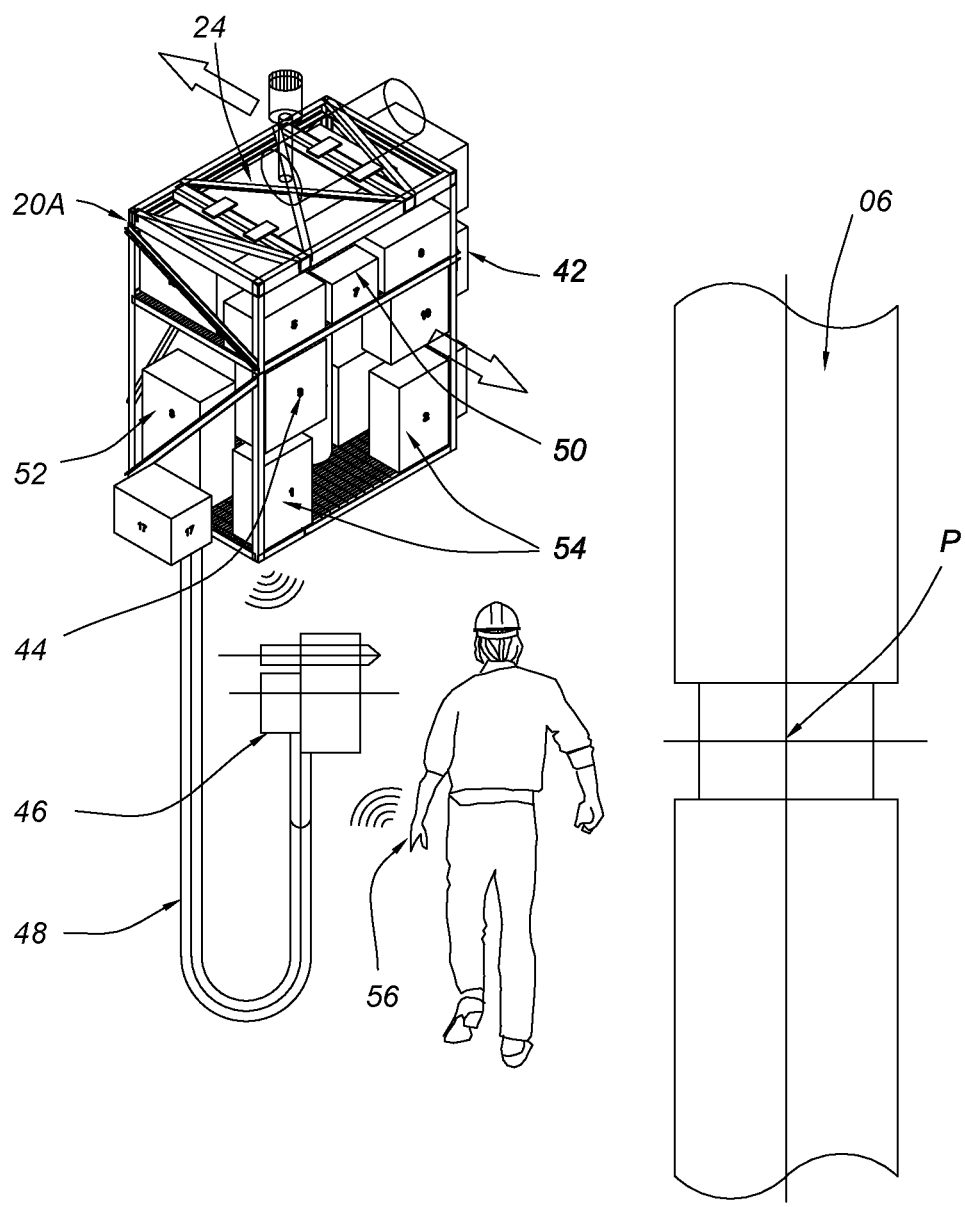
FIG. 7 shows a perspective view of a tool carriage dedicated to mechanized welding.

FIG. 7 shows one of the tool carriages 20A of FIG. 1 in further detail. The tool carriage 20A is dedicated to mechanized welding and includes motor drive 24, a power transformer 42, a distribution panel 44 to feed the required power to a welding tool 46 connected by an umbilical 48. The tool carriage 20A also includes a wireless control unit 50, gas storage and mixing units 52 and wire feeders 54.

In use of the tool carriage 20A, an operator will carry an RFID tag 56. The RFID tag 56 communicates with the wireless control unit 50 to determine the operator location. Once the welding operation is commenced, the wireless control unit 50 controls the motor drive to move the tool carriage 20A along the active rail 8 to follow the operator around the perimeter of the pipe 6. The wireless control unit 50 also communicates with the wireless control units 50 of other tool carriages 20 in order to avoid collisions. The operator may also control operation of the tool carriage 20A and welding tool 46 through direct input via the welding tool 46 or via an appropriate operator input on the distribution panel 44 or elsewhere on the tool carriage.

Figure 8:
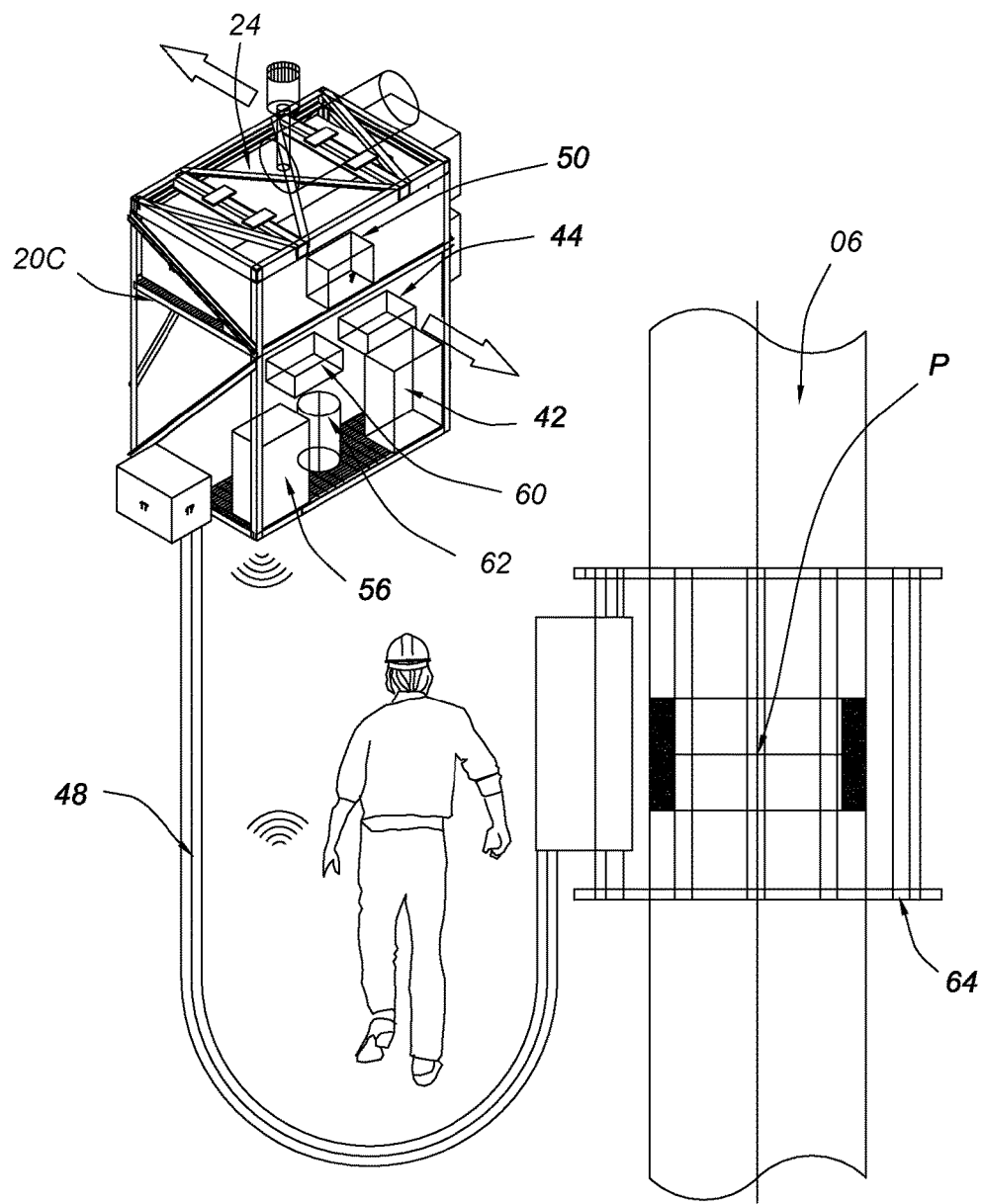
FIG. 8 shows a perspective view of a tool carriage dedicated to surface preparation.

FIG. 8 depicts tool carriage 20C of FIG. 1 in further detail. Tool carriage 20C is dedicated to surface preparation and is generally similar to tool carriage 20A. It includes motor drive 24, power transformer 42, distribution panel 44 and wireless control unit 50 and further includes a blasting machine 56, a blasting head 58 connected by umbilical 48, an aspiration system 60 and grit reservoir 62. For operation on the pipe, a blasting frame 64 is secured around the joint for containing the operation as is otherwise generally conventional.

Other tool carriages 20 will be differently configured, depending upon the work that they are intended to perform but at least the motor drive 24, power transformer 42, distribution panel 44 and wireless control unit 50 will be the same as that of tool carriages 20A and 20C. The tool carriages 20 are configured to perform one or more of the functions of pipe end preparation, preheating, inspection, mechanized welding, manual welding, weld repair, weld toe adjustment, weld inspection, field joint coating surface preparation, blasting, thermal insulation preparation, infrared heating, fusion bonded epoxy application.

Figure 9:
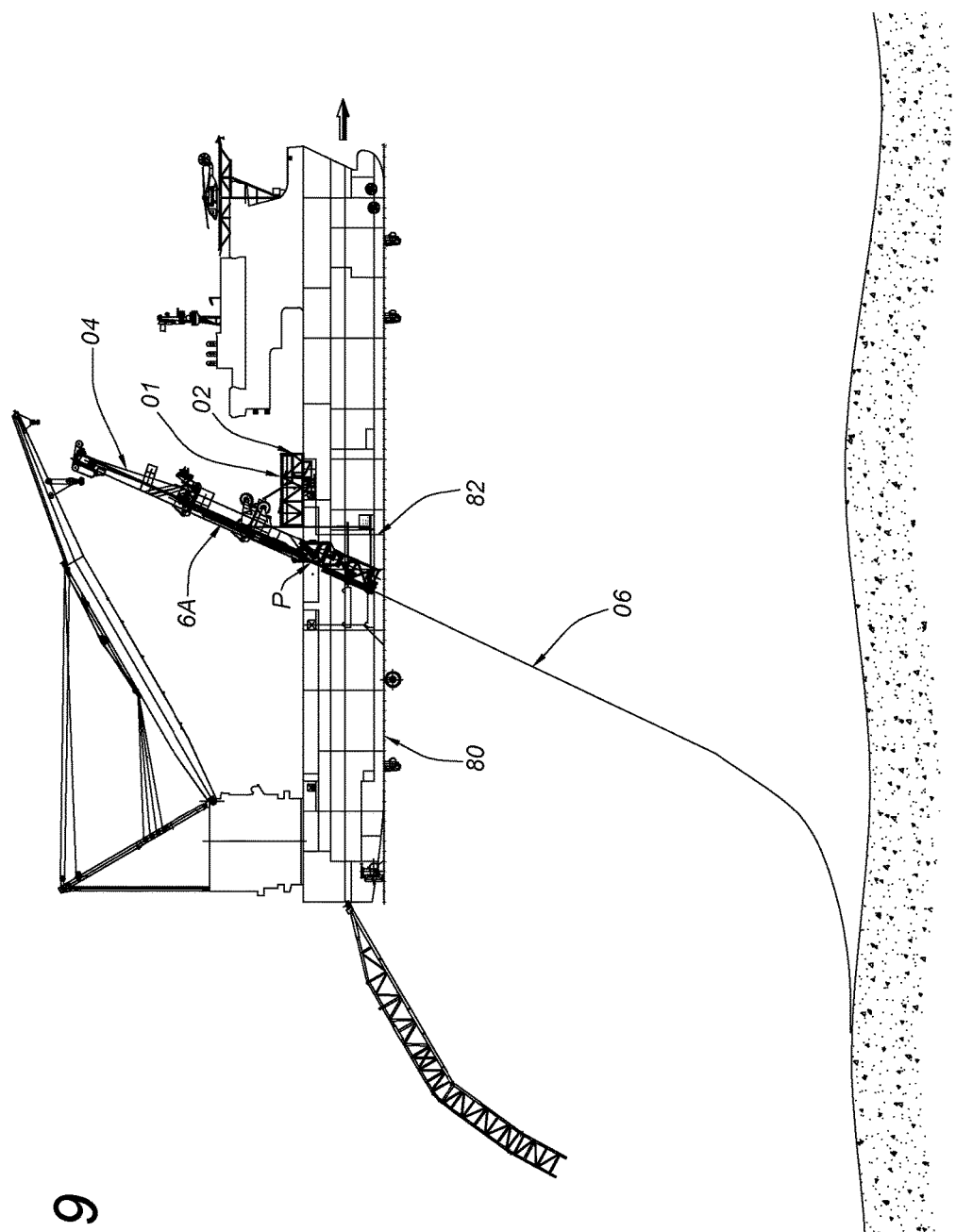
FIG. 9 shows a schematic view of a vessel with the pipe assembly station according to the invention in forward position.

FIG. 9 shows a schematic side view of a vessel 80 with the pipe assembly station 1 of FIG. 1 installed at J-lay tower 4 for deployment of pipe 6 through moonpool 82. In FIG. 9, the pipe assembly station 1 is in a forward position spaced from the field joint reference point P and a pipe segment 6A to be joined is clamped in alignment with the pipe 6.

Figure 10:
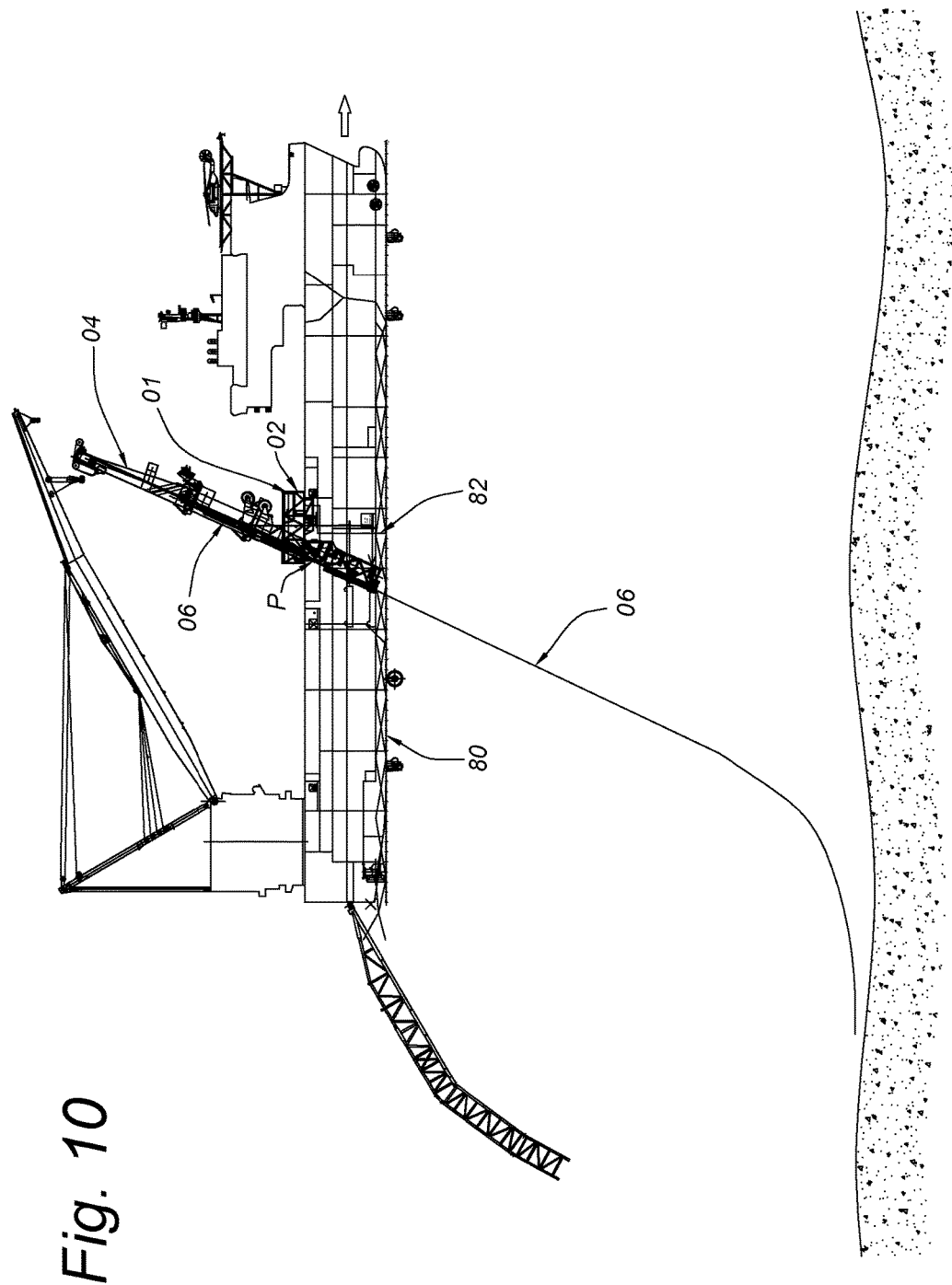
FIG. 10 shows a view similar to FIG. 9 with the pipe assembly station in a working position.

FIG. 10 shows a similar view to that of FIG. 9, with the pipe assembly station 1 skidded aft into position around the field joint reference position P.

Operation of the pipe assembly station 1 will now be further described with reference to FIGS. 1 to 10. At the commencement of the pipe assembly operation the assembly station 1 will be in the position corresponding to FIG. 9. The pipe assembly station 1 is thus free from the clamps within the J-lay tower 4 such that the pipe 6 can be advanced to the field joint reference point P and the pipe segment 6A to be joined can be correctly positioned. The tools carriages 20 will be parked in the service area 14 on the standby rail 12, where any replenishment of consumables will have taken place from appropriate sources (not shown).

Once the pipe segment 6A is installed in the J-lay tower 4 the pipe assembly station 1 will be skidded aft towards the pipe 6. To this end, the gate 18 and any required wall and floor panels 19 will be opened to allow the active rail 8 to be position around the pipe 6. Once positioned, the gate 18 is closed and the wall and floor panels 19 and other walkway components of the enclosure 2 will be replaced to allow for safe access about the pipe 6.

Once the pipe assembly station 1 is in the position depicted in FIG. 10 with the gate 18 closed and wall and floor panels 19 installed, the tool carriages 20 first required for the pipe assembly operation will be moved from the standby rail 12 to the active rail 8. This takes place under control of the central controller 5, which communicates with the wireless control units 50 of the individual carriages 20, causing operation of the respective motor drive 24. This may take place in automatic mode or semi-automatic mode under partial control of an operator. The central controller 5 not only sends data required for tool carriage displacement but also communicates with the tool carriages 20 to receive data recorded during use for the purpose of production control monitoring.

The required tool carriages 20 may enter the active rail via either of the switches 16A, B and may even be transferred simultaneously. If the required tool carriage is not the first in line on the service portions 12B and 12D, tool carriages can be parked in the first and second end portions 12A and 12E to allow the required tool carriage to enter the switch 16A, 16B. Movement of the tool carriages 20 and operation of the switches 16A, B is all controlled by the central controller 5.

After completion of the first pipe assembly operation the tool carriage 20 will be removed from the active rail 8 using one of the switches 16A, 16B and either parked towards the stern on the end portions 12A, E of the standby rail 12 or returned to the service area 14.

The next tool carriage 20 required for the subsequent pipe assembly operation will be transferred onto the active rail 8 in the same manner.

This operation will be repeated as frequently as required to complete the field joint. The ability to quickly accommodate different tool carriages 20 on the active rail allows the pipe assembly station 1 to adapt quickly to the pipe laying process requirements. Once the pipe assembly is completed, all the tool carriages 20 are returned to the standby rail 12. The gate 18 is opened and the pipe assembly station 1 is skidded forward away from the pipe 6 to the position of FIG. 9. The pipe may then be lowered and a new segment 6A installed ready for the following field joint. Although only a single pipe assembly station 1 is shown, it will be appreciated that the J-lay tower 4 may include more than one station allowing operations to take place simultaneously on two joints at two different elevations in the tower.

Thus, the invention has been described by reference to certain embodiments discussed above. It will be recognized that these embodiments are susceptible to various modifications and alternative forms well known to those of skill in the art. Many modifications in addition to those described above may thus be made to the structures and techniques described herein without departing from the spirit and scope of the invention.

The invention claimed is:

1. A pipe assembly station for supporting tools during an operation on a field joint during pipe assembly, the station comprising:
   an active rail extending around an opening through which the pipe can pass;
   a tool carriage arranged to traverse along the active rail and around a periphery of the pipe;
   a standby position distanced from the active rail; and
   a switch arranged to allow transfer of the tool carriage from the active rail to the standby position.

2. The station according to claim 1, wherein the tool carriage is self propelled.

3. The station according to claim 1, wherein the active rail is continuous allowing the tool carriage to pass completely around the pipe and the active rail has a movable portion that can be moved to allow lateral passage of the pipe to and from the opening.

4. The station according to claim 1, further comprising a standby rail extending from the switch to the standby position and the standby rail extends in a U-shape from the switch to the standby position and back to a further position adjacent to the active rail and wherein there is a second switch arranged to transfer the tool carriage from the active rail to the standby rail at the further position.

5. The station according to claim 1, further comprising a service area at the standby position arranged for servicing the tool carriage.

6. The station according to claim 5, wherein the tool carriage comprises a reservoir for receiving a quantity of a working fluid and the service area comprises a supply of the working fluid for replenishing the reservoir and the reservoir has a capacity to receive sufficient working fluid for completion of operations on a plurality of field joints.

7. The station according to claim 1, wherein the tool carriage comprises a wireless control unit operable to receive control signals from a remote location wherein control signals are received from a signal device located on an operator and the tool carriage is controlled to follow the operator during movement of the operator around the pipe.

8. The station according to claim 1, wherein the tool carriage is equipped with at least one tool selected from the group comprising: pipe end preparation tools, preheating tools; mechanized welding tools; manual welding tools; weld repair tools; weld toe adjustment tools; weld inspection tools; field joint coating tools, field joint coating surface preparation tools; blasting tools; thermal insulation preparation tools; infrared heating tools; and fusion bonded epoxy application tools.

9. The station according to claim 1, wherein the tool carriage is provided with a tool, connected thereto by an umbilical.

10. The station according to claim 1, comprising at least one active tool carriage located on the active rail and at least one standby tool carriage located at the standby position and the station is arranged to exchange the active tool carriage for the standby tool carriage.

11. The station according to claim 10, further comprising a central controller and exchange of the active tool carriage for the standby tool carriage takes place under automatic control of the central controller.

12. The station according to claim 1, further comprising a DC electrical supply to the tool carriage located in or above the active rail.

13. The station according to claim 1, further comprising an enclosure surrounding the station and comprising an operator walkway adjacent the active rail and extending around the opening through which the pipe passes.

14. A pipe assembly system comprising a pipe supporting structure arranged to support two pipe-ends to be joined in abutting relation to one another to form a pipe and a pipe assembly station according to claim 1.

15. The pipe assembly system according to claim 14, wherein the pipe supporting structure is a J-lay derrick.

16. The pipe assembly system according to claim 14, wherein the pipe assembly station is movable laterally with respect to the pipe supporting structure to encircle the pipe.

17. A pipe-lay vessel comprising the pipe assembly system of claim 14.

18. A tool carriage for use in the station according to claim 1, the tool carriage comprising a drive system for engaging and moving along a rail, at least one tool for performing an operation on a field joint, a power distribution unit for distributing power to the tool; a wireless controller for receiving control signals from a remote location and controlling operation of the tool carriage, and a reservoir for receiving a quantity of a working fluid for performing the operation.

19. A method of operating a pipe assembly station during an operation to form a field joint on a pipe, the method comprising:
   providing an active rail extending around the pipe from which the operation can be carried out;
   providing a standby rail, extending from a position adjacent to the active rail to a position distant from the active rail;
   providing a tool carriage;
   traversing the tool carriage along the active rail and around a periphery of the pipe to perform the operation;
   providing a switch arranged to allow transfer of the tool carriage from the active rail to the standby rail; and
   subsequently transferring the tool carriage from the active rail to the standby rail and moving it to the distant position.

20. The method according to claim 19, further comprising a second tool carriage located on the standby rail and the method comprises transferring the second tool carriage to the active rail.

* * * * *